US009305292B1

(12) United States Patent
Skelding

(10) Patent No.: US 9,305,292 B1
(45) Date of Patent: Apr. 5, 2016

(54) SYSTEMS AND METHODS FOR PROVIDING AN ADAPTABLE TRANSPONDER DEVICE

(75) Inventor: Dori K. Skelding, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1256 days.

(21) Appl. No.: 12/167,495

(22) Filed: Jul. 3, 2008

(51) Int. Cl.
*H04Q 5/22* (2006.01)
*G06Q 20/18* (2012.01)
*G06Q 20/10* (2012.01)
*G06Q 20/22* (2012.01)
*G06Q 20/34* (2012.01)
*G06Q 20/32* (2012.01)

(52) U.S. Cl.
CPC .............. *G06Q 20/18* (2013.01); *G06Q 20/105* (2013.01); *G06Q 20/1085* (2013.01); *G06Q 20/227* (2013.01); *G06Q 20/3224* (2013.01); *G06Q 20/3278* (2013.01); *G06Q 20/3574* (2013.01)

(58) Field of Classification Search
CPC ....... G06Q 20/00; G06Q 20/08; G06Q 20/10; G06Q 20/105; G06Q 20/108; G06Q 20/1085; G06Q 20/16; G06Q 20/18; G06Q 20/20; G06Q 20/204; G06Q 20/208; G06Q 20/22; G06Q 20/227; G06Q 20/30
USPC ................... 340/1.1, 5.2, 5.4–5.42, 5.61, 5.8, 340/5.9–5.91, 10.1, 10.5, 10.51; 705/14.1, 705/14.22, 14.27, 14.3–14.39, 14.56, 14.64, 705/14.65, 14.15–14.17, 65–68, 77, 79; 902/8–26
See application file for complete search history.

(56) References Cited

U.S. PATENT DOCUMENTS

| 3,468,046 A | 9/1969 | Makishima |
| 3,532,543 A | 10/1970 | Nole et al. |
| 3,537,195 A | 11/1970 | Gerds |
| 3,546,022 A | 12/1970 | Busch et al. |
| 3,806,369 A | 4/1974 | Dey et al. |
| 4,058,839 A | 11/1977 | Darjany |
| 4,523,297 A | 6/1985 | Ugon et al. |

(Continued)

FOREIGN PATENT DOCUMENTS

| EP | 0855659 | 7/1998 |
| WO | 98/37524 | 8/1998 |

OTHER PUBLICATIONS

Epper, A Player Goes After Big Bucks in Cyberspace, American Banker, vol. 160, No. 86, ISSN: 0002-7561, May 5, 1995, p. 17.

(Continued)

*Primary Examiner* — Steven Lim
*Assistant Examiner* — Ryan Sherwin
(74) *Attorney, Agent, or Firm* — Hunton & Williams LLP

(57) ABSTRACT

Transponder alteration systems and methods are provided for altering the state of a transponder device in the field, the transponder device used by a transponder user. The system may comprise an alteration portion, disposed in a banking system, the alteration portion inputting an alteration request from a user for an additional application to be disposed upon the user's transponder device. The processing of the alteration portion may include (1) accessing a database to retrieve data to process the alteration request; (2) generating an information packet for the user based on the retrieved data, and outputting the information packet to the user; and (3) generating a data packet based on the retrieved data, and outputting the data packet to an interim device, such that the interim device interfaces with the transponder device to transmit the data packet to the transponder device.

19 Claims, 11 Drawing Sheets

(56) References Cited

U.S. PATENT DOCUMENTS

| | | | |
|---|---|---|---|
| 4,544,834 A | 10/1985 | Newport et al. | |
| 4,582,985 A | 4/1986 | Lofberg | |
| 4,634,845 A | 1/1987 | Riley | |
| 4,689,478 A | 8/1987 | Hale et al. | |
| 4,746,787 A | 5/1988 | Okada | |
| 4,747,620 A | 5/1988 | Kay et al. | |
| 4,750,036 A | 6/1988 | Martinez | |
| 4,754,418 A | 6/1988 | Hara | |
| 4,766,293 A | 8/1988 | Boston | |
| 4,825,052 A | 4/1989 | Ugon | |
| 4,833,048 A | 5/1989 | Dejonghe et al. | |
| 4,849,618 A | 7/1989 | Namikawa et al. | |
| 4,859,837 A | 8/1989 | Halpern | |
| 4,868,376 A | 9/1989 | Lessin et al. | |
| 4,876,441 A | 10/1989 | Hara et al. | |
| 4,897,533 A | 1/1990 | Lyszczarz | |
| 4,916,296 A | 4/1990 | Streck | |
| 4,922,111 A | 5/1990 | Kuwano | |
| 4,923,288 A | 5/1990 | Allen et al. | |
| 4,968,873 A | 11/1990 | Dethloff et al. | |
| 4,977,455 A | 12/1990 | Young | |
| 4,999,617 A | 3/1991 | Uemura | |
| 5,025,373 A | 6/1991 | Keyser, Jr. | |
| 5,047,614 A | 9/1991 | Bianco | |
| 5,055,662 A | 10/1991 | Hasegawa | |
| 5,080,748 A | 1/1992 | Bonomi | |
| 5,097,115 A | 3/1992 | Ogasawara et al. | |
| 5,154,731 A | 10/1992 | Winger | |
| 5,162,175 A | 11/1992 | Visco et al. | |
| 5,168,151 A | 12/1992 | Nara | |
| 5,173,589 A | 12/1992 | Diehl | |
| 5,227,614 A | 7/1993 | Danielson | |
| 5,233,654 A | 8/1993 | Harvey et al. | |
| 5,241,161 A | 8/1993 | Zuta | |
| 5,247,190 A | 9/1993 | Friend et al. | |
| 5,249,044 A | 9/1993 | Von Kohorn | |
| 5,252,815 A | 10/1993 | Pernet | |
| 5,276,311 A | 1/1994 | Hennige | |
| 5,285,278 A | 2/1994 | Holman | |
| 5,287,181 A | 2/1994 | Holman | |
| 5,299,940 A | 4/1994 | Uenaka et al. | |
| 5,317,137 A | 5/1994 | Wilkins | |
| 5,321,240 A | 6/1994 | Takahira | |
| 5,328,809 A | 7/1994 | Holmes et al. | |
| 5,339,239 A | 8/1994 | Manabe et al. | |
| 5,340,969 A | 8/1994 | Cox | |
| 5,359,183 A | 10/1994 | Skodlar | |
| 5,396,650 A | 3/1995 | Terauchi | |
| 5,399,502 A | 3/1995 | Friend et al. | |
| 5,401,827 A | 3/1995 | Holmes et al. | |
| 5,412,192 A | 5/1995 | Hoss | |
| 5,425,497 A | 6/1995 | Sorensen | |
| 5,450,479 A | 9/1995 | Alesio | |
| 5,451,763 A | 9/1995 | Pickett et al. | |
| 5,488,571 A | 1/1996 | Jacobs | |
| 5,492,370 A | 2/1996 | Chatwin et al. | |
| 5,504,664 A | 4/1996 | Ostema | |
| 5,506,394 A | 4/1996 | Plesko | |
| 5,508,731 A | 4/1996 | Kohorn | |
| 5,510,828 A | 4/1996 | Lutterbach | |
| 5,511,114 A | 4/1996 | Stimson et al. | |
| 5,512,654 A | 4/1996 | Holmes et al. | |
| 5,513,102 A | 4/1996 | Auriemma | |
| 5,516,598 A | 5/1996 | Visco et al. | |
| 5,521,363 A | 5/1996 | Tannenbaum | |
| 5,523,179 A | 6/1996 | Chu | |
| 5,523,794 A | 6/1996 | Mankovitz | |
| 5,530,235 A | 6/1996 | Stefik et al. | |
| 5,535,147 A | 7/1996 | Jacobs | |
| 5,544,246 A | 8/1996 | Mandelbaum et al. | |
| 5,559,313 A | 9/1996 | Claus et al. | |
| 5,563,948 A | 10/1996 | Diehl | |
| 5,568,441 A | 10/1996 | Sanemitsu | |
| 5,569,898 A | 10/1996 | Fisher et al. | |
| 5,572,004 A | 11/1996 | Raimann | |
| 5,577,109 A | 11/1996 | Stimson et al. | |
| 5,582,623 A | 12/1996 | Chu | |
| 5,585,787 A | 12/1996 | Wallerstein | |
| 5,590,038 A | 12/1996 | Pitroda | |
| 5,594,493 A | 1/1997 | Nemirofsky | |
| 5,604,542 A | 2/1997 | Dedrick | |
| 5,613,095 A | 3/1997 | Moss et al. | |
| 5,621,787 A | 4/1997 | McKoy et al. | |
| 5,629,977 A | 5/1997 | Fonseca | |
| 5,649,118 A | 7/1997 | Carlisle et al. | |
| 5,652,602 A | 7/1997 | Fishman | |
| 5,663,766 A | 9/1997 | Sizer, II | |
| 5,664,110 A | 9/1997 | Green et al. | |
| 5,664,157 A | 9/1997 | Takahira et al. | |
| 5,672,678 A | 9/1997 | Holmes et al. | |
| 5,690,412 A | 11/1997 | Sheldon | |
| 5,710,458 A | 1/1998 | Iwasaki | |
| 5,721,781 A | 2/1998 | Deo et al. | |
| 5,727,153 A | 3/1998 | Powell | |
| 5,728,998 A | 3/1998 | Novis et al. | |
| 5,734,154 A | 3/1998 | Jachimowicz et al. | |
| 5,736,727 A | 4/1998 | Nakata | |
| 5,736,728 A | 4/1998 | Matsubara | |
| 5,744,789 A | 4/1998 | Kashi | |
| 5,751,953 A | 5/1998 | Sheils | |
| 5,760,381 A | 6/1998 | Stich et al. | |
| 5,761,624 A | 6/1998 | Mooney | |
| 5,763,862 A | 6/1998 | Jachimowicz | |
| 5,767,896 A | 6/1998 | Nemirofsky | |
| 5,770,843 A | 6/1998 | Rose et al. | |
| 5,770,849 A | 6/1998 | Novis et al. | |
| 5,777,305 A | 7/1998 | Smith et al. | |
| 5,777,306 A | 7/1998 | Masuda | |
| 5,777,903 A | 7/1998 | Piosenka et al. | |
| 5,778,067 A | 7/1998 | Jones et al. | |
| 5,789,732 A | 8/1998 | McMahon | |
| 5,789,733 A | 8/1998 | Jachimowicz et al. | |
| 5,793,502 A | 8/1998 | Bianco et al. | |
| 5,804,806 A | 9/1998 | Haddad | |
| 5,806,044 A | 9/1998 | Powell | |
| 5,806,045 A | 9/1998 | Biorge | |
| 5,807,627 A | 9/1998 | Friend et al. | |
| 5,815,127 A | 9/1998 | Jacobs | |
| 5,815,658 A | 9/1998 | Kuriyama | |
| 5,817,207 A | 10/1998 | Leighton | |
| 5,819,234 A | 10/1998 | Slavin et al. | |
| 5,844,230 A | 12/1998 | Lalonde | |
| 5,854,595 A | 12/1998 | Williams | |
| 5,857,079 A | 1/1999 | Claus et al. | |
| 5,857,709 A | 1/1999 | Chock | |
| 5,859,419 A | 1/1999 | Wynn | |
| 5,870,155 A | 2/1999 | Erlin | |
| 5,877,941 A | 3/1999 | Ryu | |
| 5,880,769 A | 3/1999 | Nemirofsky | |
| 5,884,271 A | 3/1999 | Pitroda | |
| 5,887,271 A | 3/1999 | Powell | |
| 5,890,135 A | 3/1999 | Powell | |
| 5,920,844 A | 7/1999 | Hotta et al. | |
| 5,930,217 A | 7/1999 | Kayanuma | |
| 5,952,639 A | 9/1999 | Ohki | |
| 5,952,641 A | 9/1999 | Korshun | |
| 5,955,961 A | 9/1999 | Wallerstein | |
| RE36,356 E | 10/1999 | Gloton et al. | |
| 5,988,503 A | 11/1999 | Kuo | |
| 5,995,372 A | 11/1999 | Asakura | |
| 6,002,383 A | 12/1999 | Shimada | |
| 6,003,770 A | 12/1999 | Schilling | |
| 6,004,681 A | 12/1999 | Epstein et al. | |
| 6,005,183 A | 12/1999 | Akai et al. | |
| 6,016,954 A | 1/2000 | Abe et al. | |
| 6,019,284 A | 2/2000 | Freeman et al. | |
| 6,025,283 A | 2/2000 | Roberts | |
| 6,027,028 A | 2/2000 | Pieterse et al. | |
| 6,036,099 A | 3/2000 | Leighton | |
| 6,045,042 A | 4/2000 | Ohno | |
| 6,049,463 A | 4/2000 | O'Malley et al. | |
| 6,087,954 A | 7/2000 | McSpadden et al. | |
| 6,089,284 A | 7/2000 | Kaehler et al. | |
| 6,091,817 A | 7/2000 | Bertina et al. | |

(56) References Cited

U.S. PATENT DOCUMENTS

| | | | |
|---|---|---|---|
| 6,095,072 | A | 8/2000 | Kaufhold |
| 6,095,412 | A | 8/2000 | Bertina et al. |
| D431,039 | S | 9/2000 | Wilson |
| D431,252 | S | 9/2000 | Wilson |
| 6,121,069 | A | 9/2000 | Boyko et al. |
| D431,573 | S | 10/2000 | Wilson |
| D432,141 | S | 10/2000 | Wilson |
| D432,548 | S | 10/2000 | Wilson |
| D432,552 | S | 10/2000 | Wilson |
| D433,031 | S | 10/2000 | Wilson |
| D433,032 | S | 10/2000 | Wilson |
| D433,033 | S | 10/2000 | Wilson |
| D433,034 | S | 10/2000 | Wilson |
| D433,035 | S | 10/2000 | Wilson |
| D433,036 | S | 10/2000 | Wilson |
| D433,037 | S | 10/2000 | Wilson |
| D433,059 | S | 10/2000 | Okumura et al. |
| 6,128,599 | A | 10/2000 | Walker et al. |
| D433,420 | S | 11/2000 | Wilson |
| D433,421 | S | 11/2000 | Wilson |
| D433,422 | S | 11/2000 | Wilson |
| D433,423 | S | 11/2000 | Wilson |
| D433,424 | S | 11/2000 | Wilson |
| D434,041 | S | 11/2000 | Burke |
| 6,146,741 | A | 11/2000 | Ogawa et al. |
| 6,164,548 | A | 12/2000 | Curiel |
| 6,170,745 | B1 | 1/2001 | Schilling |
| D437,882 | S | 2/2001 | Creighton |
| 6,214,155 | B1 | 4/2001 | Leighton |
| 6,250,555 | B1 | 6/2001 | Inamoto |
| 6,294,241 | B1 | 9/2001 | Kaule et al. |
| 6,308,887 | B1 | 10/2001 | Korman et al. |
| 6,315,195 | B1 | 11/2001 | Ramachandran |
| 6,318,536 | B1 | 11/2001 | Korman |
| 6,328,342 | B1 | 12/2001 | Belousov et al. |
| 6,337,752 | B1 | 1/2002 | Heckenkamp et al. |
| 6,382,506 | B1 | 5/2002 | Van Der Valk |
| 6,441,736 | B1 | 8/2002 | Leighton |
| 6,471,128 | B1 | 10/2002 | Corcoran et al. |
| 6,482,330 | B1 | 11/2002 | Bajorek |
| 6,492,717 | B1 | 12/2002 | Gore et al. |
| 6,514,367 | B1 | 2/2003 | Leighton |
| 6,533,180 | B1 | 3/2003 | Wood |
| 6,549,912 | B1 | 4/2003 | Chen |
| 6,557,766 | B1 | 5/2003 | Leighton |
| 6,609,658 | B1 | 8/2003 | Sehr |
| D481,068 | S | 10/2003 | Blossom et al. |
| 6,631,849 | B2 | 10/2003 | Blossom |
| 6,644,551 | B2 | 11/2003 | Clayman et al. |
| 6,702,181 | B2 | 3/2004 | Ramachandran |
| 6,715,797 | B2 | 4/2004 | Curiel |
| 6,734,887 | B2 | 5/2004 | Field |
| 6,796,490 | B1 | 9/2004 | Drummond et al. |
| 6,957,334 | B1 | 10/2005 | Goldstein |
| 6,965,868 | B1 | 11/2005 | Bednarek |
| 7,025,256 | B1 | 4/2006 | Drummond et al. |
| 7,040,533 | B1 | 5/2006 | Ramachandran |
| 7,150,393 | B1 | 12/2006 | Drummond et al. |
| 7,239,226 | B2 * | 7/2007 | Berardi et al. ............... 340/5.61 |
| 7,376,583 | B1 * | 5/2008 | Rolf ................. 705/17 |
| 7,424,441 | B2 * | 9/2008 | George et al. ............. 705/14.27 |
| 7,562,813 | B2 * | 7/2009 | Humphrey et al. ........... 235/379 |
| 7,774,231 | B2 * | 8/2010 | Pond et al. ........................ 705/15 |
| 7,827,115 | B2 * | 11/2010 | Weller et al. .................... 705/78 |
| 7,917,123 | B2 * | 3/2011 | Juntunen ..................... 455/411 |
| 7,982,609 | B2 * | 7/2011 | Padmanabhan et al. ... 340/572.1 |
| 2001/0011250 | A1 | 8/2001 | Paltenghe et al. |
| 2002/0117846 | A1 | 8/2002 | Kaule et al. |
| 2003/0009382 | A1 * | 1/2003 | D'Arbeloff et al. ............ 705/17 |
| 2003/0024995 | A1 | 2/2003 | Conner et al. |
| 2003/0047253 | A1 | 3/2003 | Robinson et al. |
| 2003/0187787 | A1 * | 10/2003 | Freund ............................ 705/39 |
| 2003/0202151 | A1 | 10/2003 | Hinata |
| 2004/0049451 | A1 | 3/2004 | Berardi |
| 2004/0121257 | A1 | 6/2004 | Kaminsky et al. |
| 2004/0159709 | A1 | 8/2004 | Ohta et al. |
| 2004/0217178 | A1 | 11/2004 | Lasch et al. |
| 2005/0012326 | A1 | 1/2005 | Keller et al. |
| 2005/0194453 | A1 | 9/2005 | Conner et al. |
| 2006/0102729 | A1 | 5/2006 | Gandel et al. |
| 2006/0106674 | A1 * | 5/2006 | Muller ............................ 705/14 |
| 2006/0124753 | A1 | 6/2006 | Scholz et al. |
| 2006/0214008 | A1 | 9/2006 | Asami et al. |
| 2007/0170264 | A1 | 7/2007 | Lasch et al. |
| 2007/0174116 | A1 * | 7/2007 | Keith et al. ..................... 705/14 |
| 2007/0203825 | A1 | 8/2007 | Hanifin et al. |

OTHER PUBLICATIONS

Sotto, An RFID Code of Conduct, RFID Journal, Featured Opinions, May 30, 2005.
BSI2000 Files Patent Application for Optical Bank Card Press Release, printed Apr. 27, 2004.
Brehl, Banks issue cash-card pledge, The Toronto Star, Oct. 9, 1997, 1 page.
Card Flash, Daily Payment Card News, www.CardWeb.com, printed Aug. 10, 2004.
Rosen, Cash Just Isn't Flexible Enough: Shops of the Future Will Only Take Cards, Daily Express, Technology Section, Feb. 10, 1995, 1 page.
Hesseldahl, China Goes Smartcard Crazy, www.forbes.com, Jun. 12, 2001.
Schwartz, Digital Cash Payoff.
E-Z Pass, Web page, http://www.ezpass.com-Disc__portNewYork.html, Nov. 12, 2001.
E-Z Pass, Web page, http:\\www.ezpass.com-Disc__ny__annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Nokia Announces the World's First NFC Enabled Mobile Product for Contactless Payment and Ticketing, PRNewswire, Feb. 9, 2005.
Proton world and Europay to co-operate in creation of new CEPS-compliant e-purse application, Press Release 1999, Waterloo, Belgium, Jun. 28, 1999, 2 pages.
Purse Application for Cross Border Use in Euro, Cordis, Pace 1st 1999-11531 Pace, www.cordis.lu, printed Feb. 23, 2001, 3 pages.
RFID Tags, Contactless Smart Card Technology and Electronic Passports: Frequently Asked Questions, www.smartcardalliance.org, Feb. 17, 2005.
RFID Tags, Contactless Smart Card Technology: Comparing and Contrasting Applications and Capabilities, www.smartcardalliance.org, Feb. 17, 2005.
SK100 Smart Card Electronic Purse Balance Reader, SK100 Balance Reader, http://perso.wanadoo.fr, printed Feb. 23, 2001, 1 page.
Gilhooly, Smart Cards, Smart Move?, Computerworld, May 21, 2001, pp. 1-5.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Dvorak, Smartcards Get Smarter, www.forbes.com, Jun. 1, 2001.

(56) References Cited

OTHER PUBLICATIONS

Hesseldahl, Stock Focus: Smartcard Companies, www.forbes.com, Jun. 18, 2001.
The Electronic Purse Reaches the Car Park, http:\\docs.vircom.net/mobility/parking, printed Feb. 23, 2001, 2 pages.
Stuber, The electronic purse: An overview of recent development and issues, Bank of Canada, Technical Report No. 74, www.bankofcanada.ca, Jan. 1996, printed Feb. 23, 2001, 2 pages.
Transponders: Cash in a Flash, www.forbes.com, Jul. 31, 2001.
Hesseldahl, U.S. Getting Wise to Smart Cards, Forbes.com, May 25, 2000.
Understanding the benefits: Smartcity offers a number of important benefits to both the card issuers and their customers, http://www.icl.com/smartcards/benefits.htm, printed Feb. 27, 2001, 2 pages.
Visa first to launch electronic purse load via GSM mobile phone, www.cellular.co.za, Johannesburg, ZA, printed Feb. 23, 2001, 4 pages.
Hansell, Visa to unveil electronic purse cards, New York Times, printed Feb. 23, 2001, 2 pages.
Visa, MBNA and De La Rue Launch Multi-Function Smart Card Program, www.findarticles.com, Jul. 6, 1998.
Machlis et al., Will smart cards replace ATMS?, Computerworld, printed Feb. 23, 2001, 3 pages.

\* cited by examiner

SYSTEMS AND METHODS FOR PROVIDING AN ADAPTABLE TRANSPONDER DEVICE

FIELD OF THE INVENTION

The systems and methods of the invention relate to transponder devices and related technologies.

BACKGROUND OF THE INVENTION

Radio-frequency identification (RFID) devices are known. In particular, it is known to provide a sticker, adapted to be affixed to a surface, that includes an RFID transponder. The RFID transponder may interface with various other devices, and is provided appropriate circuitry and memory to perform desired tasks.

However, known RFID devices are lacking. In particular, known RFID devices, and RFID systems, do not provide desired capabilities to be altered in the field, i.e., after the RFID device has been put into use by a customer, for example. The invention addresses this and other shortcomings of known technology.

SUMMARY OF THE INVENTION

Transponder alteration systems and methods are provided for altering the state of a transponder device in the field, the transponder device used by a transponder user. The system may comprise an alteration portion, disposed in a banking system, the alteration portion inputting an alteration request from a user for an additional application to be disposed upon the user's transponder device. The processing of the alteration portion may include (1) accessing a database to retrieve data to process the alteration request; (2) generating an information packet for the user based on the retrieved data, and outputting the information packet to the user; and (3) generating a data packet based on the retrieved data, and outputting the data packet to an interim device, such that the interim device interfaces with the transponder device to transmit the data packet to the transponder device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF PREFERRED EMBODIMENTS

Hereinafter, aspects of methods and systems in accordance with various embodiments of the invention will be described. As used herein, any term in the singular may be interpreted to be in the plural, and alternatively, any term in the plural may be interpreted to be in the singular.

The invention provides an RFID device that is readily alterable in the field. Aspects of the invention include both electronic/circuitry attributes, as well as the particular physical components used in the system. In particular, the RFID device may be in the form of a sticker attached to a cell phone. The invention may include the RFID device being provided with a chip that includes multiple file structures. The file structures may be dedicated to respective features, applications and/or operations. Each file structure may be provided its own key management component.

In particular, each of the key management components may be responsible for locking or unlocking a respective application that is on the RFID device. Such an application, when in an unlocked state, provides the user with various functionality associated with the application, (e.g. a loyalty application).

Further, the invention is not limited to merely unlocking applications that are already on the RFID device. Rather, new applications may be loaded on a particular user's RFID device, i.e., on a chip of the RFID device, assuming that the particular chip is provided for such processing.

Figure 1:
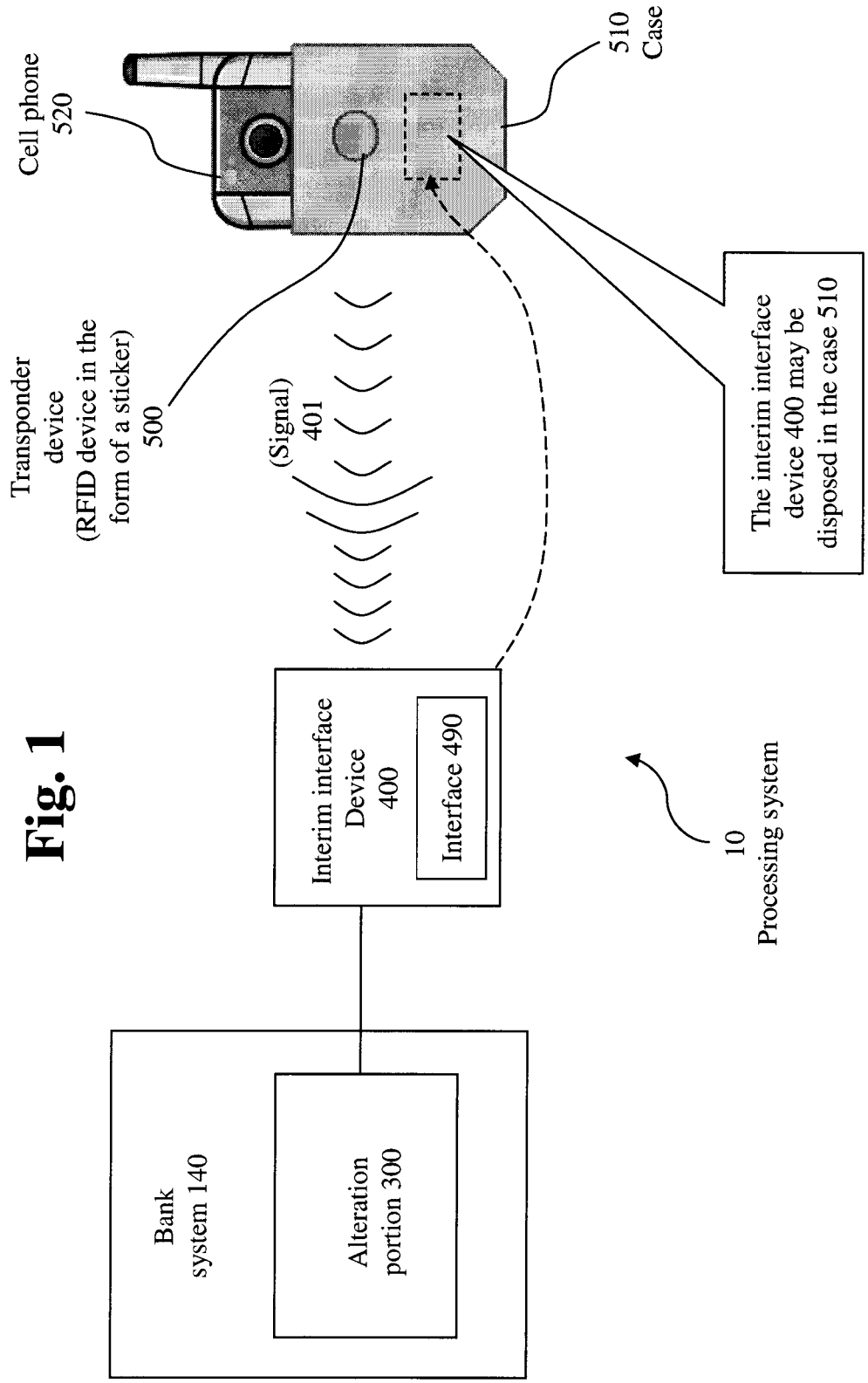
FIG. 1 is a block diagram showing aspects of a processing system relating to field alteration of a transponder, in accordance with one embodiment of the invention.

FIG. 1 is a block diagram showing a processing system 10 in accordance with one embodiment of the invention. As shown, the processing system 10 includes a bank system 140. The bank system 140 includes an alteration portion 300. The processing system 10 further includes an interim interface device 400 and a transponder device 500 (e.g. an RFID device attached to a cell phone). Further details of the various components shown in FIG. 1 are described below. The systems and methods of embodiments of the invention may be used in conjunction with various systems, such as that described in U.S. application Ser. No. 09/630,595 filed Aug. 1, 2000, which is incorporated by reference herein in its entirety.

In accordance with one example of the invention, a customer is provided with the RFID device 500, i.e., the customer is provided with an RFID device or some other suitable transponder. The customer's RFID device 500 may, for example, be in the form of a sticker (an RFID sticker). The RFID sticker may be positioned on their cell phone, or some other personal item.

Illustratively, the customer, subsequent to being provided the RFID device 500, desires to participate in, i.e., subscribe to, a "loyalty" program, for example. The customer logs onto a particular web site (e.g. of a bank) and accesses their account after satisfying appropriate security measures, e.g. user id and password. Through interfacing with the web site, the customer indicates that she wishes to participate in the loyalty program, and that she wishes to use her RFID sticker in conjunction with such participation. In response, the bank's system 140 outputs instructions to the customer, and in harmony with the instructions, initiates the processing to place the requested loyalty application on the customer's RFID sticker 500.

Thereafter, in one embodiment of the invention, the bank's system 140 outputs a data packet to what might be characterized as an "interim interface device", i.e., the interim interface device 400 of FIG. 1. The interim interface device 400 inputs the data packet from the bank's system 140. Thereafter, using the information in the data packet, the interim interface device 400 interfaces with the RFID sticker 500 to load the desired application (e.g. the loyalty application) onto the customer's RFID sticker. For example, Bluetooth technology might be utilized to interface the interim interface device 400 with the RFID sticker 500. Such interfacing may include unlocking file structures in the RFID sticker, loading the application and other data onto the file structures, locking the file structures, and/or other processing. Thereafter, the customer may use the newly loaded application, e.g. by the RFID sticker interfacing with a merchant participate system in some suitable manner.

The "interim interface device" 400 may be in a variety of forms. For example, the interim interface device may be a processing portion with power supply disposed in a sleeve, in which the cell phone is disposed, or a sticker cover, which is adhered to the cell phone with the RFID sticker placed inside, as to conceal the sticker. The sleeve might be constructed of suitable elastomer material, for example, so as to both secure the cell phone and afford for embedding of the processing portion in the sleeve. Alternatively, the interim interface device might be the user's computer, or the cell phone itself (if provided with a suitable processing portion). The interim interface device 400 might be integrated with the cell phone (or other device) processing portion. Accordingly, the cell phone 520 (or other device) might talk directly to the transponder device 500. Alternatively, the interim interface device 400 might be constituted by a separate processing portion that is disposed with the cell phone processing portion, such as in the case 510. Alternatively, the interim interface device might be a permanently disposed system to which a user must go (to have the application loaded to their RFID device). For example, a user might have to go to a metro station (to load a metro application via a suitable reader, over which the phone is passed)). In one embodiment of the invention, processing may be used to both trigger the loading of an application, as well as convey when an application load is completed.

The interim interface device 400 may be provided with an interface 490, i.e., a user interface. The interface 490 may be provided to convey (to a user) the status of operation or state of the interim interface device 400. For example, the interface 490 might reflect whether the interim interface device 400 is interfacing with the alteration portion 300, the transponder device 500, or some other device. The interface 490 may convey the progress of such communications. In general, the interface 490 may be provided to convey any aspect of the operation of the interim interface device 400. For example, in order to communicate, the interface 490 might include a display, a text display, a status bar, lights, a screen, a character display (e.g. text), and/or other suitable interface mechanism. As described above, the invention might be used in conjunction with a cell phone. However, the invention might also be used in conjunction with other devices, such as PDAs. Further, while Bluetooth technology might be used as described above, any suitable personal area or other network might be used so as to provide communication between the alteration portion 300, the interim interface device 400, the transponder device 500 and other processing components.

The invention may include various other features as described below. The RFID device might display certain attributes under particular conditions (such as when a particular application in the RFID device is utilized, when particular processing is performed, when an account balance is low, or when a particular account is accessed, for example). A button (or other interface) might be provided on the RFID device to control processing, e.g. what account is to be debited.

As described above, the invention provides an RFID device that is readily alterable in the field. Aspects of the invention include both electronic/circuitry attributes, as well as the particular physical components and methodology used in the system. The adaptable RFID device as described herein may be used in a variety of applications. However, in particular, the RFID device described herein may be used to effect financial transactions.

In order to provide further context of the invention, hereinafter, the processing of an RFID transaction will illustratively be described with reference to FIG. 2 and FIG. 3. Thereafter, various further aspects of the alteration portion 300 and related processing will be described.

Figure 2:
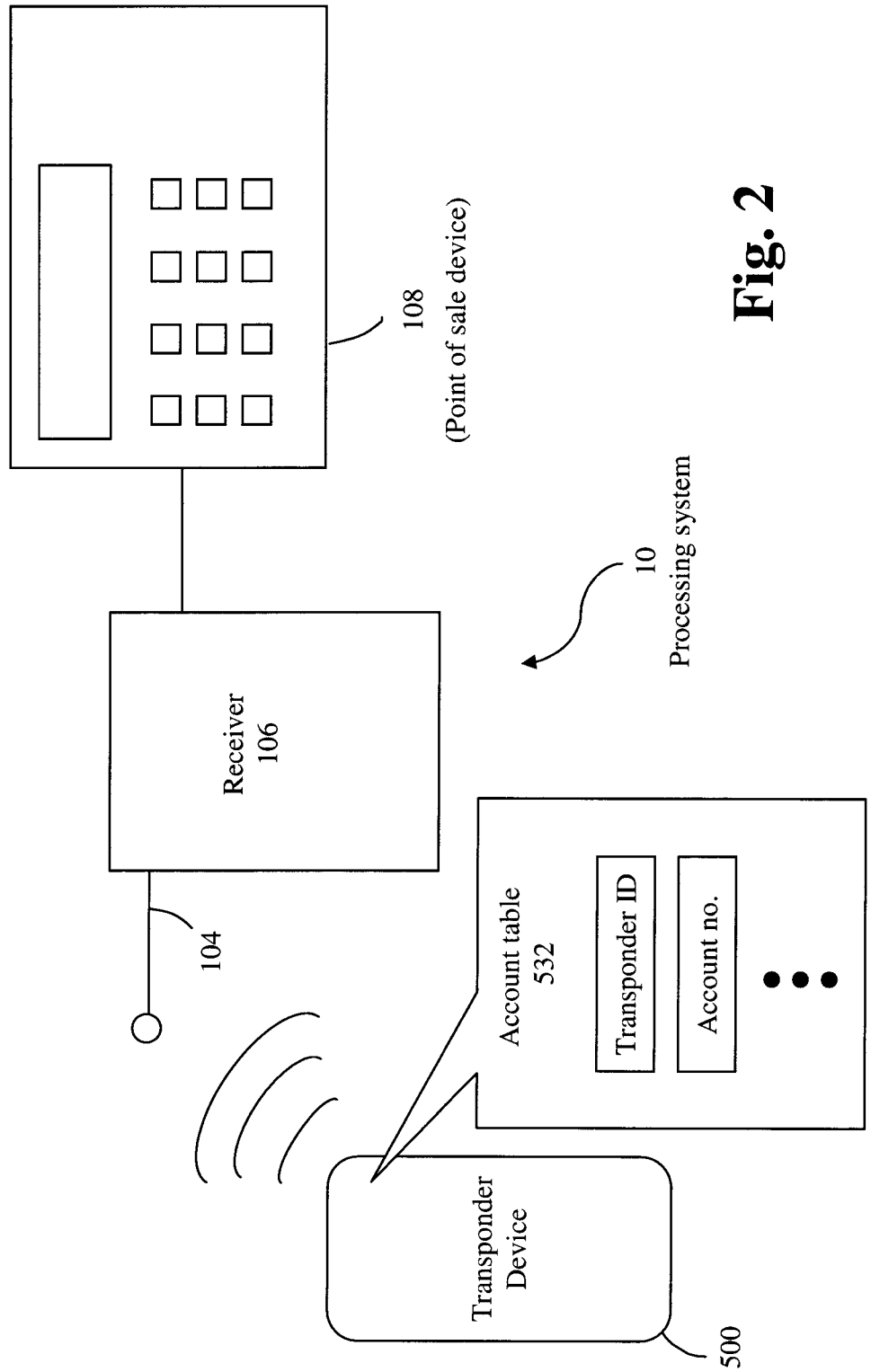
FIG. 2 is a block diagram showing aspects of the processing system relating to transaction architecture, in accordance with one embodiment of the invention.

FIG. 2 shows one architecture, in accordance with an embodiment of the invention. That is, FIG. 2 illustrates an overall point of sale architecture that includes a transponder 500 which communicates via an RF link 104 to a receiver 106. The transponder 500 may be or include an electromagnetically coupled device (as described below), generally activated by proximity to an RF-enabled receiving unit, such as the receiver 106. Transponder 500 may, for instance, contain an electromagnetic coil antenna for inductive coupling to receiver 106, thereby being energized with small but sufficient electric current to activate embedded electronics within the transponder 500. Those electronics may include memory such as CMOS memory, logic gates, filters for isolating discrete transmission frequencies, file structures for containing discrete applications. Further, the transponder device 500 may contain various components known in the art for use with RFID devices.

In embodiments, as described in detail below, transponder 500 may be programmable and able to receive program modules, update programmable instructions, unlock programs or instructions, as well as to have electronic memory erased or updated during transactions, for example. Receiver 106 may include an electromagnetic antenna to couple with transponder 500, generally within the range of a few feet of the device.

In the embodiment illustrated in FIG. 2, the receiver 106 is connected to a point of sale (POS) device 108 for conducting a commercial or other transaction. For instance, the point of sale device 108 may be or include any of several commercially known electronic cash registers or related transaction processing equipment. In one embodiment of the invention, transponder 500 may be embedded within a personal article for convenience, aesthetic and/or affinity purposes. In that regard, the invention might be integrated in one implementation within a fully functional cell phone (as shown in FIG. 1), PDA, watch, key chain, pager, clothing or some other item.

In the operation of the transponder device 500, a user approaches the receiver 106 at the point of sale device 108 to initiate and complete a purchase or other transaction, such as at a restaurant or grocery market checkout line, or some other point of sale.

In the embodiment illustrated in FIG. 2, transponder 500 contains an account table 532. The account table 532 may be provided to include a variety of information, including an encoded transponder ID, which may for instance be a 5-digit number or other identifying information. The account table 532 may also include an account number and other information, as desired. The account table 532 may be provided to directly record account information for the subscribed user of the transponder 500.

In the implementation of this embodiment of the invention, receiver 106 is configured to receive the account table 532 and apply an amount being executed at the point of sale device 108 to the account reflected within the account table 532. For instance, a patron who has subscribed to an account according to the system of the invention may approach receiver 106 in a restaurant line and wave a cell phone, watch or other article containing transponder 500 in proximity of the receiver 106. When transponder 500 comes within range of receiver 106, transponder 500 may be inductively coupled to the coils of an electromagnetic antenna within receiver 106 inducing electrical energy within transponder 500, to establish the RF link 104 with the receiver 106. Upon activation of transponder 500 and radiation of transponder ID to the receiver 106, the receiver 106 may respond with an acknowledge signal to the transponder 500. The point of sale device 108 may indicate on a display screen or otherwise that a transaction is ready to be commenced. Once the point of sale device 108 generates total amount due for the transaction, the receiver 106 may interrogate transponder 500 to obtain account table information from account table 532 for application to the sale.

For instance, if a patron has purchased a meal in a restaurant line at point of sale device 108, the total purchase price may be validated for completion of the transaction. Conversely, if the amount of the transaction cannot be validated, the point of sale device 108 may indicate "cash required" or another message that transponder validation or authorization has failed. If the transaction amount is validated, receiver 106 enters the transaction amount and transmits the revised account table 532 information over the RF link 104 to the transponder 500. A transaction completion signal may be emitted by receiver 106, which in one embodiment may turn off or decouple the transponder 500 via RF link 104.

Figure 3:
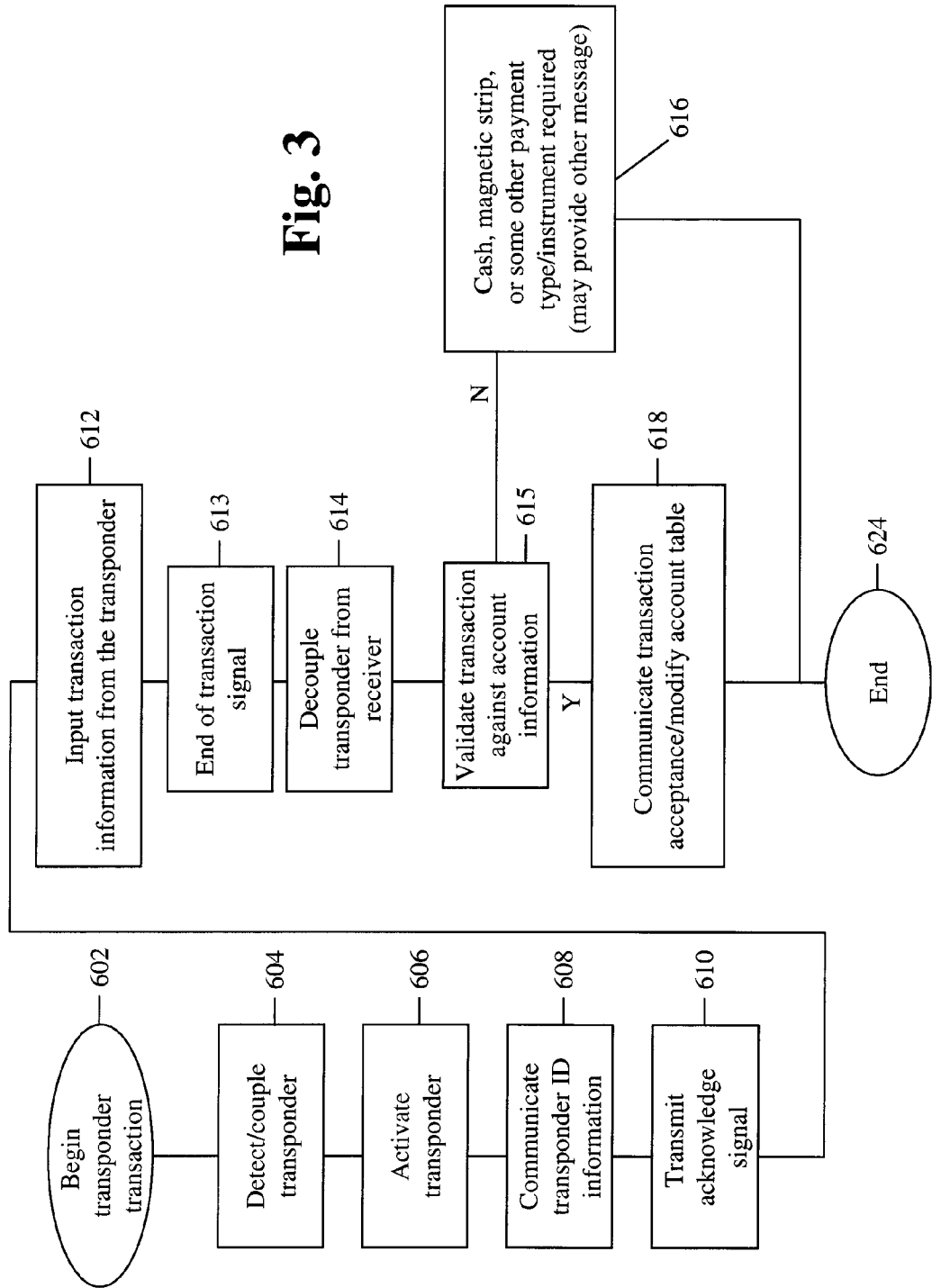
FIG. 3 is a flowchart showing transaction processing in accordance with one embodiment of the invention.

In further explanation of the above transaction processing, overall transaction processing is illustrated in the flowchart of FIG. 3, i.e., FIG. 3 shows the processing associated with a transaction. In step 602 of FIG. 3, processing begins. The process then passes to step 604. In step 604, the receiver 106 is presented with transponder 500 within range of electromagnetic coupling, such as inductive coupling. In step 606, transponder 500 is activated, for instance by inductive energization of its circuitry. In step 608 transponder 500 may communicate transponder ID 110, which the receiver 106 acknowledges with an acknowledge signal over RF link 104 in step 610.

In step 612, transaction information is input from the transponder. After step 612, the process passes to step 613.

In step 613, an end of transaction signal is sent to transponder 500. Then, in step 614, transponder 500 decouples from the receiver 106.

In step 615 of FIG. 3, transaction table 532 or other account information may be interrogated to determine whether account parameters permit the pending transaction at the point of sale device 108, i.e., a validation process is performed on the transaction. If the transaction is not validated, then in step 616 a message is generated that some other payment type or instrument is needed to complete the requested transaction. For example "cash required" or "magnetic strip required" or some other message, may be provided to the customer at the point of sale device 108. After step 616, processing proceeds to step 624. In step, as reflected in FIG. 3, the processing ends.

If the account to be applied to the pending transaction is validated at step 614, in step 618, the point of sale device 108 and receiver 106 communicate with transponder 500 to indicate transaction acceptance, and modify information within account table 532 if appropriate. In step 624, processing ends.

Accordingly, as set forth above, the processing of an transponder/RFID transaction was illustratively described with reference to FIG. 2 and FIG. 3. Hereinafter, various further aspects of the invention, including registration of an transponder device 500, and processing of the alteration portion 300 will be described, as well as various other features.

Figure 4:
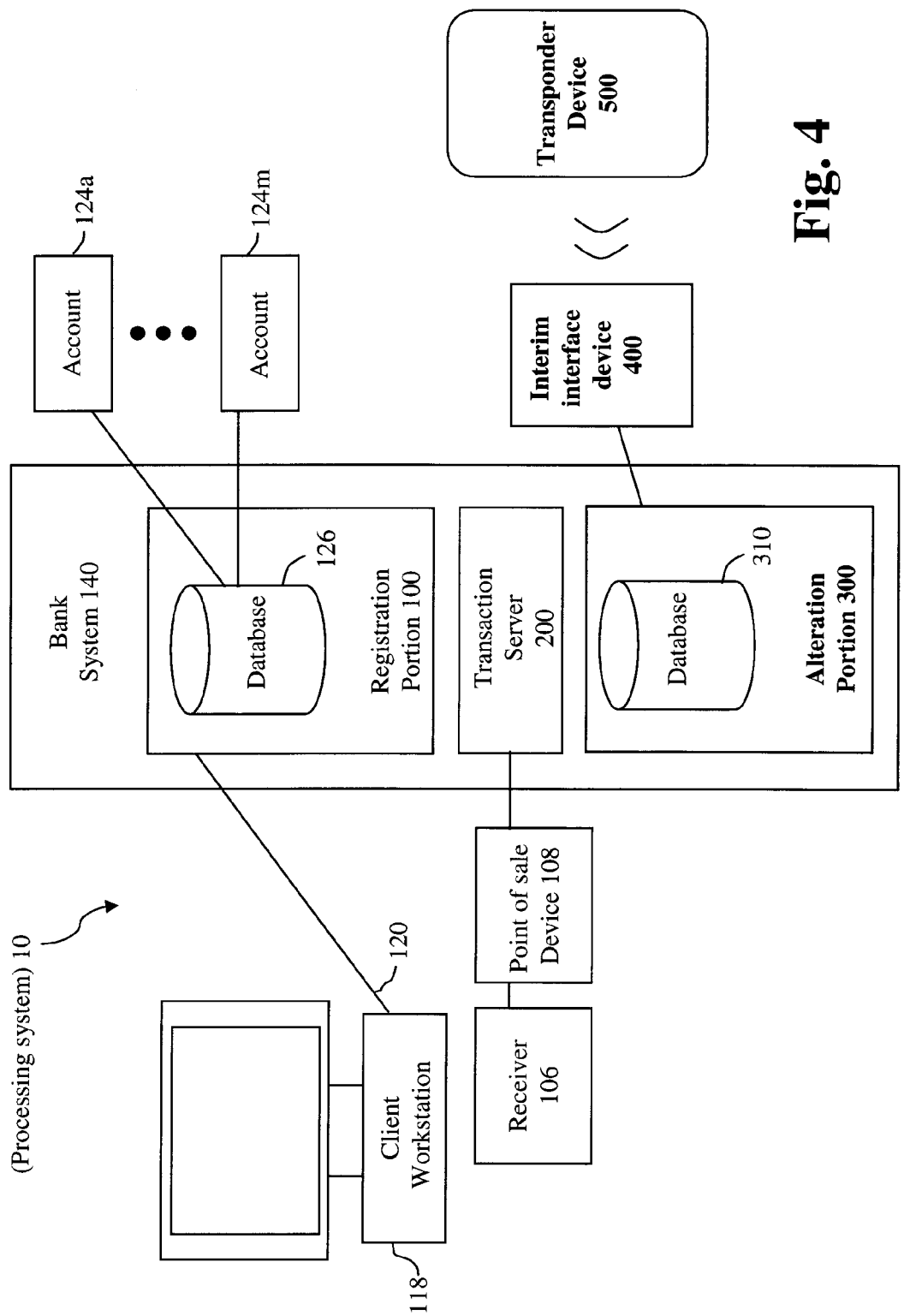
FIG. 4 is a block diagram showing further aspects of the processing system, including an activation architecture for the initiation of user accounts, in accordance with one embodiment of the invention.

FIG. 4 is a further block diagram showing additional features of the processing system 10 of FIG. 1 and FIG. 2. That is, FIG. 4 shows interaction of the processing components of FIG. 1 and FIG. 2 into the processing system 10. FIG. 4 also shows additional processing components.

In accordance with embodiments of the invention, the invention provides a transponder device 500 that is alterable in the field. However, prior to being disposed in the field and used by customer, the transponder device 500 is issued to a customer and registered in some manner. Relatedly, FIG. 4 includes various processing components to effect such registration.

Figure 10:
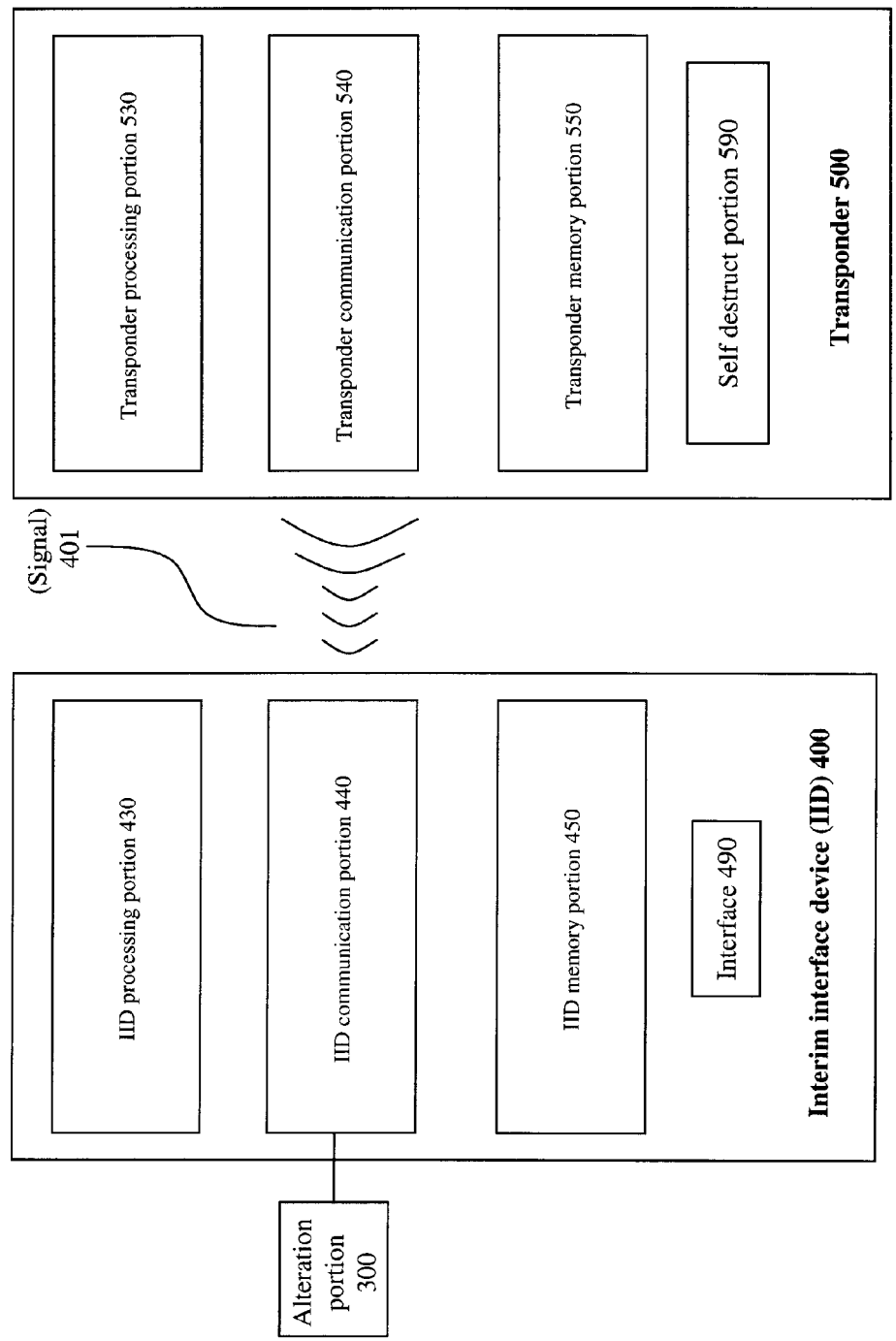
FIG. 10 is a block diagram showing further details of the interim interface device and the transponder device 500 in accordance with one embodiment of the invention.

In particular (in addition to various other processing components, the processing system 10 of FIG. 10 includes a registration portion 100, and a database 126 that holds various data needed in the processing of the registration portion 100. The processing system 10 also includes a client workstation 118.

In terms of new accounts registration as illustrated in FIG. 4, in the invention, a network-based activation architecture may be advantageously employed. That is, in accordance with one embodiment of the invention, a new user is provided with the transponder device 500 in some suitable manner. For example, the new user might be sent the transponder device 500 via mail. Once the transponder device 500 is received, in accordance with one embodiment of the invention, the new user effects registration using their own client workstation 118. That is, the client workstation 118 may access the registration portion 100 via a communications link 120, for example.

As shown in FIG. 4, the registration portion 100 (which may be in the form of a server) communicates with client workstation 118 to receive preassigned information related to transponder 500, such as the transponder ID. The transponder ID may be provided to the user in any suitable manner, such as being printed on the transponder device 500 or conveyed to the user in a separate communication, e.g. via a separate mailing.

In setting up a new account, the transponder ID, particulars of the user, as well as other information are transmitted from the user (at the client workstation 118) to the registration portion 100. The registration portion 100 initiates operation of the transponder device 500, and associates such operation with an account or accounts, as desired. The client workstation 118 may be in the form of various devices, including a computer, cell phone, a PDA (personal digital assistant), a BLACKBERRY, a kiosk, or other suitable device.

The account may illustratively include or be more than one type of account 124*a* . . . 124*n*, such as cash accounts, debit accounts, credit card accounts, special purpose vending accounts, telephone card accounts, or others. The registration portion 100 may validate the transponder ID 110, and interrogate a new subscriber (user) at client work station 118 to identify or select which one or more of accounts 124a . . . 124n the user wishes to associate with the transponder 500.

For instance, the registration 100 may accept a preexisting credit card number for registration with the transponder 500 and execution of future transactions. Once the new account is established, and the transponder device 500 is operational, the bank system 140 may communicate via network connection to the point of sale device 108 and receiver 106, i.e., to authorize transactions at the point of sale 108.

Accordingly, FIG. 4 shows one methodology by which a transponder device 500 might be registered.

As shown in FIG. 4, the bank system 140 also includes a transaction server 200. The transaction server 200 may be provided to interface with the point of sale device 108 in conjunction with processing transactions. For example, the transaction server 200 may effect authorization of a particular transaction that is requested at the point of sale device 108.

FIGS. 5-8 show various processing in accordance with embodiments of the invention. Such processing is described in detail below. Such processing may be performed by the alteration portion 300, the interim interface device 400 and the transponder device 500, in conjunction with other processing components. Hereinafter, further details of the such processing components are described with reference to FIG. 9-11

Figure 9:
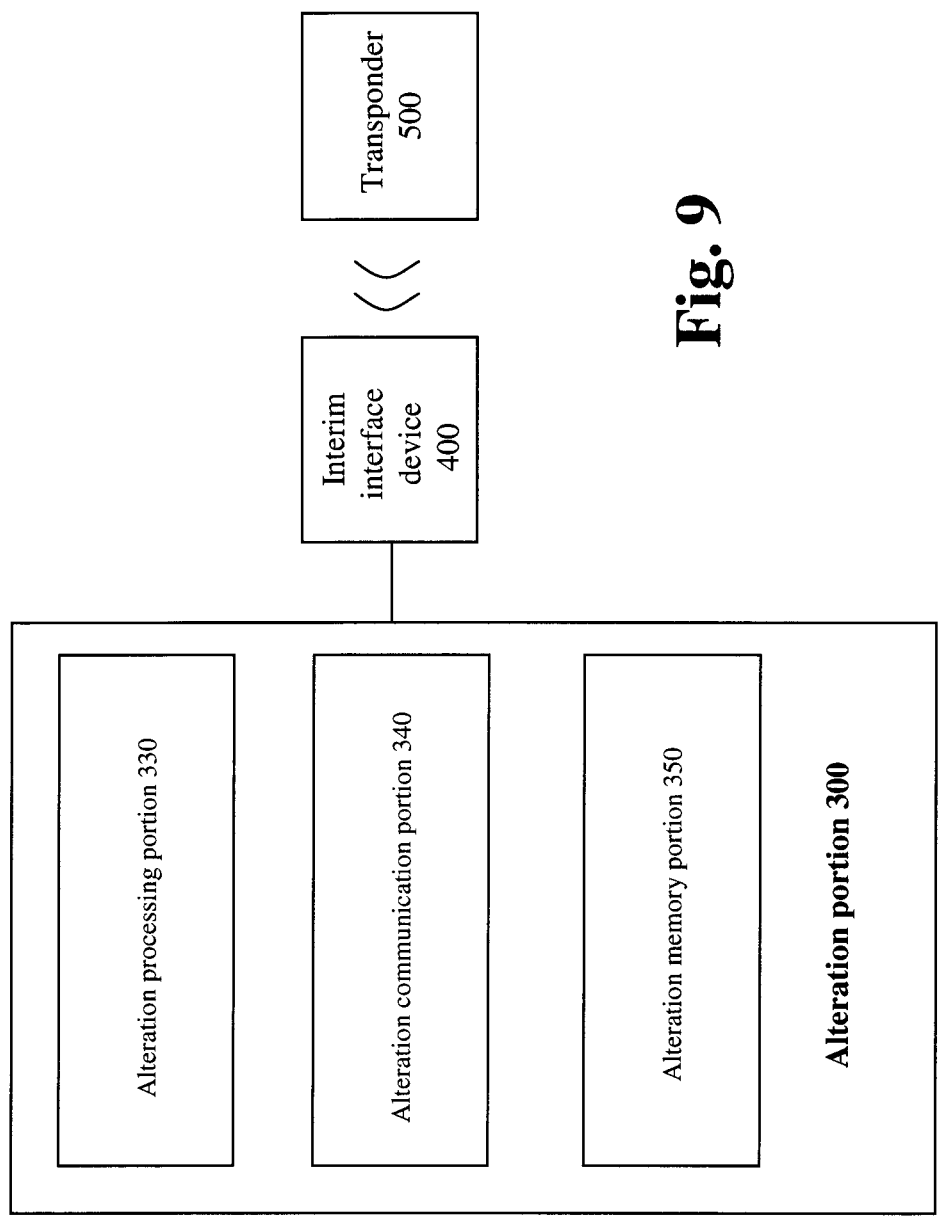
FIG. 9 is a block diagram showing further details of the alteration portion in accordance with one embodiment of the invention.

FIG. 9 shows further details of the alteration portion 300 in accordance with one embodiment of the invention.

The alteration portion 300 includes an alteration processing portion 330, an alteration communication portion 340, and an alteration memory portion 350.

The alteration processing portion 330 performs a variety of processing, including inputting a request from a customer for an additional application to be loaded upon their transponder device, authenticating the request to determine if the customer has credentials for the particular requested application, preparing data packets to effect the placement of the new application on the customer's transponder device, and various related processing. The alteration communication portion 340 provides for the alteration portion 300 to effect various communications, such as communications with the interim interface device. The alteration memory portion 350 of the alteration portion 300 store a variety of data used in the processing of the alteration processing portion 330.

Various further features and aspects of the alteration portion 300 will be described below.

As described herein, various applications are disposed on the transponder device 500, e.g. such as a loyalty application, a transit application, and others. The applications may interface with other devices (including merchant devices) on respective frequencies. Further, the respective applications may use respective and different handshakes to interface with other devices. In accordance with one embodiment of the invention, the respective frequencies and handshakes (that will be utilized in operation of the particular application on the transponder device 500) may be coordinated ahead of time, i.e., prior to loading the file structure and/or application on the transponder device 500. Alternatively, the respective frequencies and handshakes may be coordinated in some dynamic manner. For example, the interim interface device 400 may be provided to determine which frequencies/handshakes are already in use on the transponder device 500, and provide that a new application (that is being loaded on the transponder device 500) have a different frequency/handshake. Further, in accordance with one embodiment of the invention, the frequencies and/or handshakes used by the transponder device 500 may be updated by the interim interface device 400, or other suitable device.

Relatedly, it is of course appreciated that various distinct handshakes may be utilized. That is, a first handshake may be utilized in the interface of the alteration portion 300 vis-à-vis the interim interface device 400. A further handshake may be utilized in the interface of the interim interface device 400 vis-à-vis the transponder device 500. A further handshake may be utilized in the interface of the transponder device 500 vis-à-vis a merchant device, i.e., in use of the transponder device 500.

The systems and methods of embodiments as described herein relate to the loading of a further application on a customer's transponder device. Illustratively, features of the invention are described herein with reference to a loyalty application. Various other applications may be loaded upon a customer's transponder device 500 as desired (assuming the needed file structure and other particulars are suitably provided). Thus, applications loaded on the transponder device might include a loyalty application, a rewards application, a public transportation application, building access applications, transit related applications, account or fund access related applications, micropayment applications, discount applications, as well as applications relating to other financial tasks or operations, boarding passes, copy machines, computer access, access to facilities, usage capabilities, access and use in a particular environment (such as on a college campus), dining, student ID info, and others, for example. FIG. 10 shows further details of the interim interface device 400 and the transponder device 500 in accordance with one embodiment of the invention.

The interim interface device 400 includes a IID (interim interface device) processing portion 430, an IID communication portion 440, and an IID memory portion 450. The IID processing portion 430 in general handles the processing performed by the interim interface device 400, e.g. including the processing described below with reference to FIGS. 5-8. The IID communication portion 440 handles the communications effected by the interim interface device 400. Further, the IID memory portion 450 handles storage of the various data used by the interim interface device 400.

The transponder device 500 of FIG. 10 also includes various processing components. The transponder device 500 includes the transponder processing portion 530, the transponder communication portion 540 and the transponder memory portion 550. The transponder processing portion 530 in general handles the processing performed by the transponder device 500. The transponder communication portion 540 handles the communications effected by the transponder communication portion 540. Further, the transponder memory portion 550 handles storage of the various data used by the transponder device 500.

Figure 11:
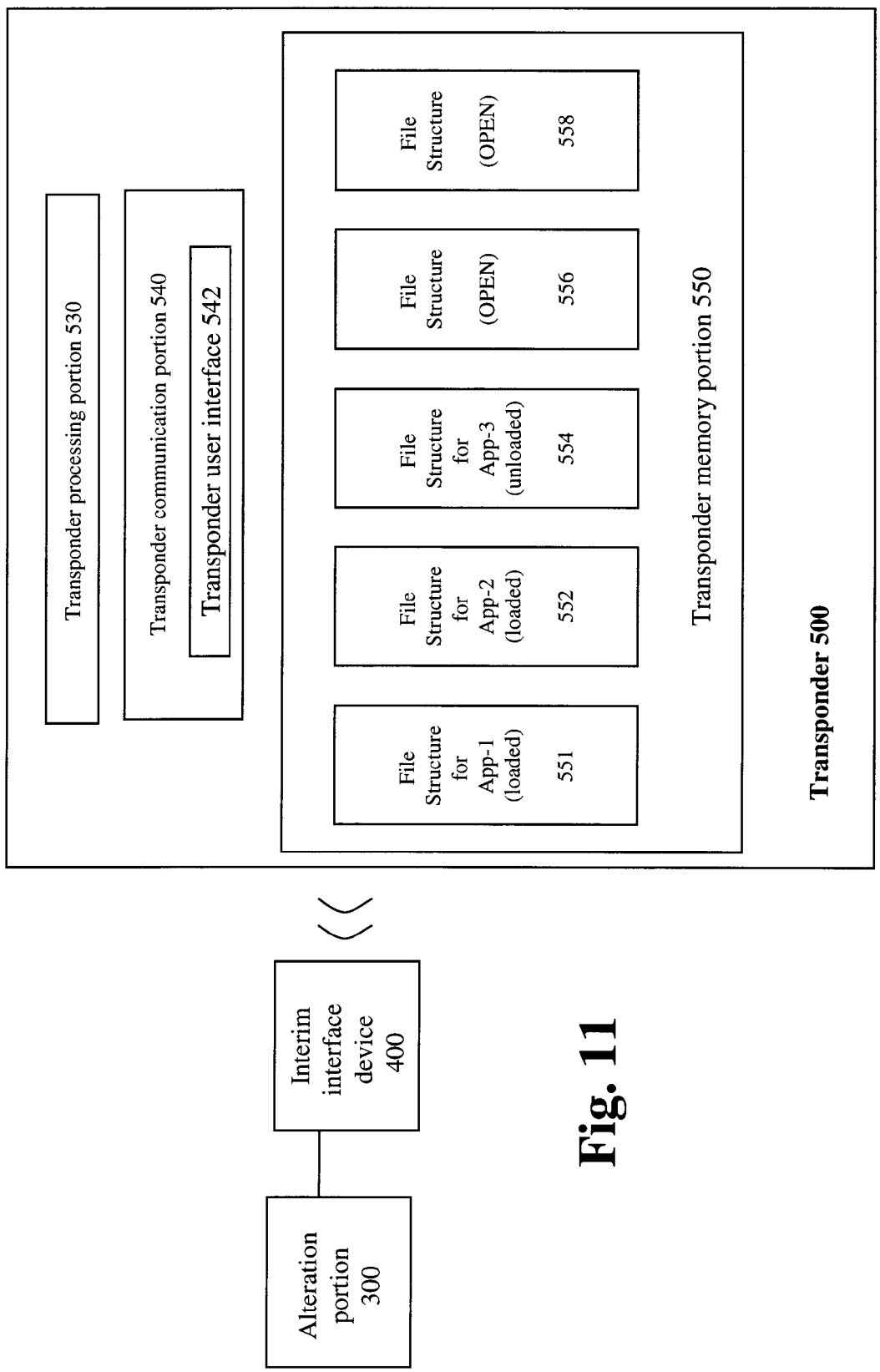
FIG. 11 is a block diagram showing yet further details of the transponder device in accordance with one embodiment of the invention.

FIG. 11 shows yet further details of the transponder device 500 in accordance with one embodiment of the invention. In particular, FIG. 11 shows further details of the transponder memory portion 550.

The transponder memory portion 550 includes various file structures. In accordance with one embodiment of the invention, each of the file structures supports (or is provided to support) a particular application. That is, for example, the transponder memory portion 550 includes a file structure for a first application 551, a file structure for a second application 552, and a file structure for a third application 554. The file structures 551 and 552 reflect that the file structures are for a particular application, and that those applications are indeed loaded in the file structure and are ready for use. On the other hand, the file structure for application 554 reflects that the file structure is for a particular application, but that the application is not yet been loaded on the transponder memory portion 550.

Further, as shown in FIG. 11, the open file structure 556 and the open file structure 558 reflect that such file structures are included in the transponder memory portion 550. However, such file structures are not yet loaded. Accordingly, desired applications may be loaded onto such file structures in accord with the invention. That is, the file structures 556, 558 are adaptable to be loaded with different file structures. However, it is appreciated that any application to be loaded on the open file structures 556 and 558 would generally need to conform to a protocol, i.e., that the file structure is set up for.

Figure 5:
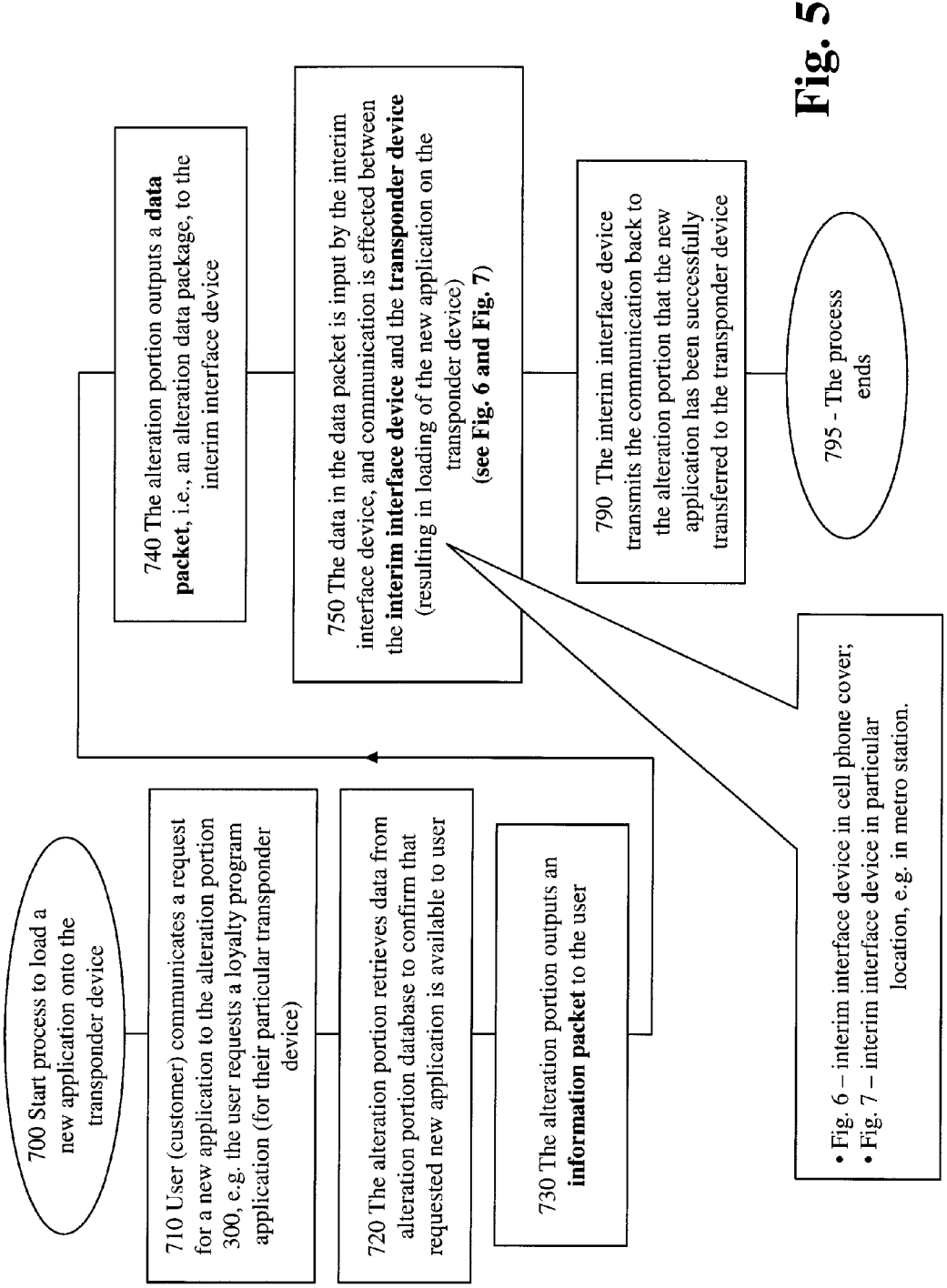
FIG. 5 is a flowchart showing a process by which a new application is loaded onto the transponder, in accordance with one embodiment of the invention.

Hereinafter, further aspects of the processing of the processing system 10 will be described with reference to FIG. 5. Specifically, FIG. 5 is a flow chart showing processing that is performed by the alteration portion 300. Such processing is performed after the particular transponder device 500 is in the field, i.e., meaning that the transponder device 500 has been issued to the customer, is registered with the bank system 140, and is available for use (or is being used) by the customer.

As shown in FIG. 5, the process to load a new application onto the transponder device 500 of a user (i.e., a customer) starts in step 700, and passes to step 710 In accordance with one embodiment of the invention, it is appreciated that loading of a new application may be performed in response to various events. For example, loading of an application may result from a user request. Further, the loading of an application might be performed in response to a particular trigger event, including loading in an automated manner in response to a trigger event. For example, a particular application might be loaded upon the customer taking a particular action or sequence of actions. An example is that upon a customer doing a certain amount of business with a merchant, and application associated with such merchant would be automatically loaded upon the customer's transponder device 500. For example, a particular application might be loaded dependent on location of the customer, such as a customer being at a particular coffee shop five times. Such location information might be used in conjunction with transaction information so as to trigger the loading of a particular application. With regard to automatic loading of a particular application, a customer might be asked if it is acceptable to load the application, or the application might be loaded in accord with some prior approval or understanding with the customer.

Returning now to FIG. 5, in step 710, the user communicates a request for a new application to the bank system 140, i.e. to the alteration portion 300. Alternatively, another entity, such as a merchant or financial entity, might submit the request. With the user submitting the request, for example, the user might request a loyalty program application or some other desired application. In step 710, for example, the customer might provide identifying information. That is, in accordance with one embodiment of the invention, a bank (or affiliate) issues a particular transponder device 500 to a customer. The transponder device 500 may be identified by suitable identifying information, such a an identification number. The identification number (or other indicia) might be disposed on the transponder device 500 or the case 510, or otherwise, for example. The bank of course is aware of the composition of the particular transponder device 500, i.e., what software and file structure, for example, is on the particular transponder device 500. Thus, for example, upon the customer providing a request (including the identifying information, with a device identification number), the bank knows what is disposed on the particular transponder device 500, knows what further applications/updates are available to the customer, and knows what the customer has requested. Based on such information, the bank system 140, for example, can output the appropriate data to be loaded upon the transponder device 500.

After step 710 of FIG. 5, the process passes to step 720. Then, the process passes to step 720.

In step 720, the alteration portion 300 retrieves data from alteration portion database 310 to confirm that requested new application is available to the user. Then, in step 730, the alteration portion outputs an information packet to the user. For example, the information packet might simply advise the user that the loading of the additional application is underway and/or the information packet might instruct the user that a particular action is needed on their part, in order to effect the loading of the new application. For example, the user may have to go to a particular physical location at which the interim interface device 400 is disposed, e.g. a metro station. After step 730, the process passes to step 740.

In step 740, the alteration portion 300 outputs a data packet to the interim interface device 400. Then, the process passes to step 750.

In step 750, the data in the data packet is input by the interim interface device 400. Further, in step 750, at least some of the data in the data packet is transferred from the interim interface device 400 to the transponder device 500. Further details of the processing of step 750 are described below with reference to FIG. 6.

After step 750, the process passes to step 760. In step 760, the interim interface device 400 transmits a communication back to the alteration portion 300 that the new application has been successfully transferred to the transponder device 500.

Then, in step 770, the process ends.

Figure 6:
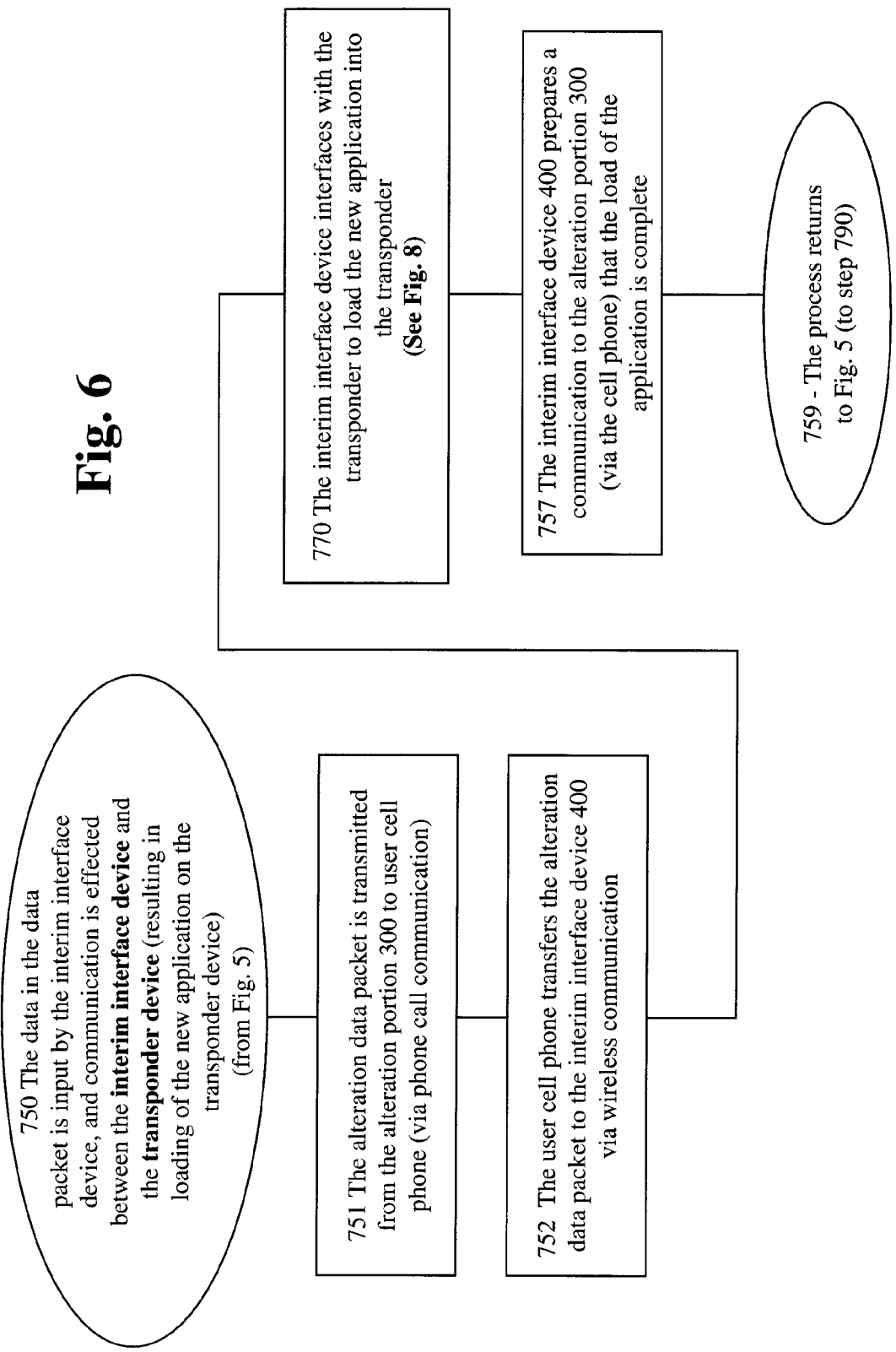
FIG. 6 is a flowchart showing further details of the processing of FIG. 5, relating to the interim interface device communicating with a transponder, in accordance with one embodiment of the invention.

FIG. 6 is a flowchart showing further details of step 750 of FIG. 5, i.e., further details of the processing in which data in the alteration data packet is input by the interim interface device, and is transferred from the interim interface device to the transponder device. In particular, FIG. 6 is a flowchart illustrating an arrangement wherein the interim interface device 400 is disposed in a case or sleeve 510 of a cell phone 520 and the transponder 500 is a sticker on the cell phone.

As shown in FIG. 6, the subprocess starts in step 750 (i.e., flows from step 750 of FIG. 5) and passes to step 751. In step 751, an alteration data packet is transmitted from the alteration portion 300 to the user cell phone. For example, this might be effected via a phone call communication from the alteration portion 300 to the user's cell phone 520. Then, in step 752, the user cell phone transfers the alteration data packet to the interim interface device 400. This transfer might be performed via a suitable wireless communication, for example. Then, the process passes to step 770.

In step 770, the interim interface device interfaces with the transponder to load the new application into the transponder. Further details of step 770 are described below with reference to FIG. 8.

Once the new application is loaded in step 770, the process passes to step 757.

In step 757, the interim interface device 400 prepares a communication to the alteration portion 300 (via the cell phone) that the load of the application is complete. Then, the process passes to step 759.

In step 759, the process returns to FIG. 5, and in particular passes to step 790 of FIG. 5, as described above.

Figure 7:
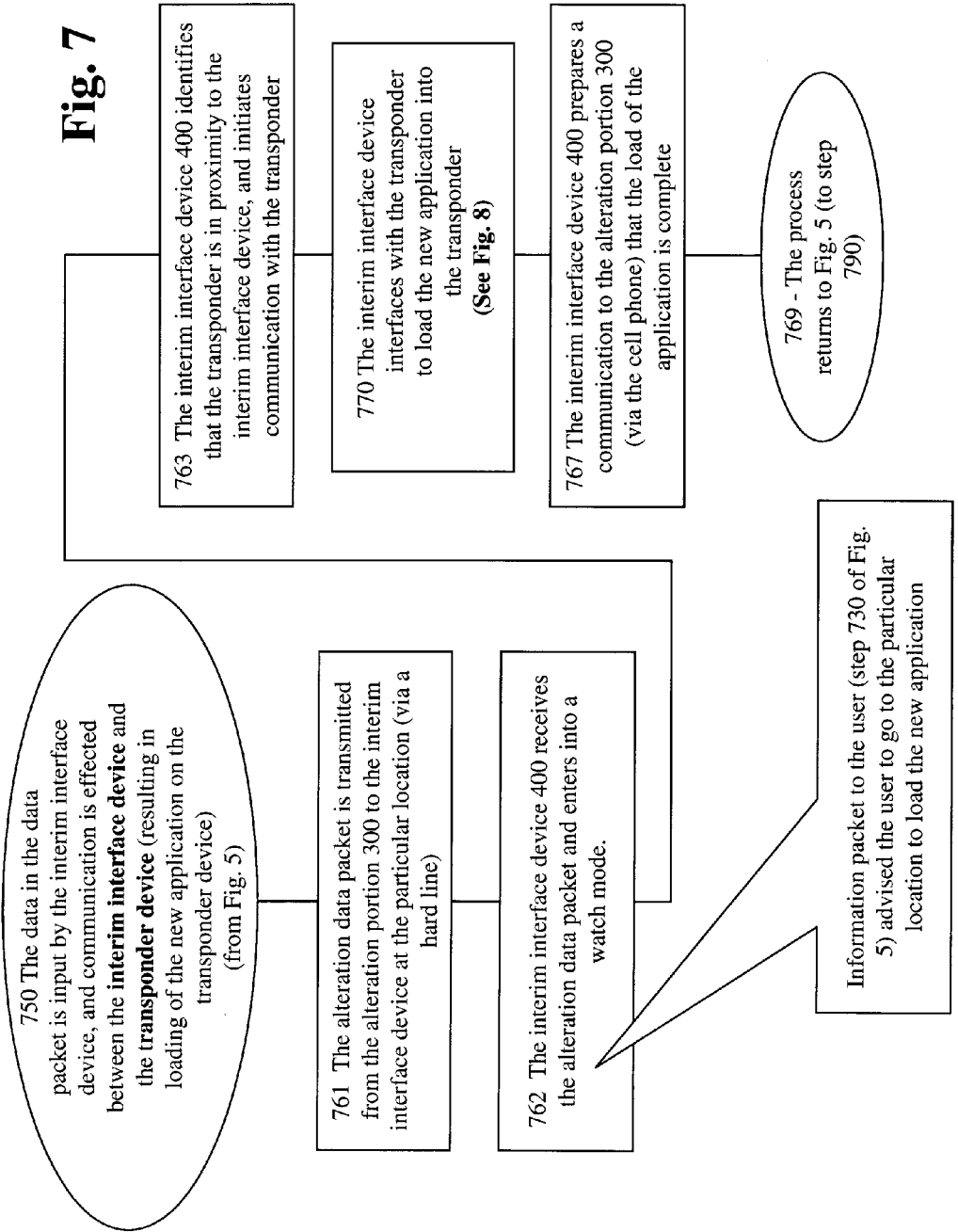
FIG. 7 is a further flowchart showing further details of the processing of FIG. 5, relating to the interim interface device communicating with a transponder, in accordance with one embodiment of the invention.

In accordance with a further embodiment of the invention, FIG. 7 is a flowchart illustrating an arrangement wherein the interim interface device is disposed in a particular location, i.e., in contrast to the arrangement of FIG. 6. For example, the interim interface device might be disposed in any of a variety of locals, including a bank, adjacent to an ATM, in a public transit location (e.g. a metro station), at a merchant location, or any other location.

The process of FIG. 7 starts in step 750 (i.e., flows from step 750 of FIG. 5), and passes to step 761. In step 761, the alteration data packet is transmitted from the alteration portion 300 to the interim interface device at the particular location (via a hard communication line, for example). Then, in step 762, the interim interface device 400 receives the alteration data packet and enters into a watch mode.

As reflected in FIG. 7, the information packet to the user (step 730 of FIG. 5), in this embodiment, advised the user to go to the particular location to load the new application. In response, the user goes to location. Once the user approaches the location, the watch mode of the interim interface device is provided so as to detect when the user is in proximity to the interim interface device, i.e., so as to initiate communications between the interim interface device and the transponder of the user.

In step 763, the interim interface device 400 identifies that the transponder is in proximity to the interim interface device, and initiates communication with the transponder. Then, the process passes to step 770.

In step 770, the interim interface device interfaces with the transponder to load the new application into the transponder. Further details of step 770 are described below with reference to FIG. 8.

Once the new application is loaded in step 770, the process passes to step 767.

In step 767, the interim interface device 400 initiates the communication to the alteration portion 300 (via a hard line or other communication interface) that the load of the application is complete. Then, the process passes to step 769.

In step 769, the process returns to FIG. 5, i.e., the process passes to step 760 of FIG. 5.

As noted above, FIG. 8 is a flowchart showing processing associated with the interim interface device interfacing with the transponder to load the new application into the transponder (of FIGS. 6 and 7) in further detail in accordance with one embodiment of the invention.

In further explanation of the processing of FIG. 5, it is appreciated, in accordance with one embodiment of the invention, the transponder device 500 (and the circuitry, file structure and/or chip in the transponder device 500) is inactive, i.e., doesn't perform processing, until an external device activates such component, e.g. powers up such component. An external device that activates the transponder device 500 might be a merchant device (e.g. the receiver 106 of FIG. 2 or the interim interface device 400, for example.) Illustratively, in the case of the interim interface device 400, the interim interface device 400 might recognize (or be recognized by) the transponder device 500. Once the transponder device 500 is recognized, the transponder device 500 determines what updates or applications have been accorded to the particular transponder device 500. Processing is then performed to load such updates and/or applications.

Figure 8:
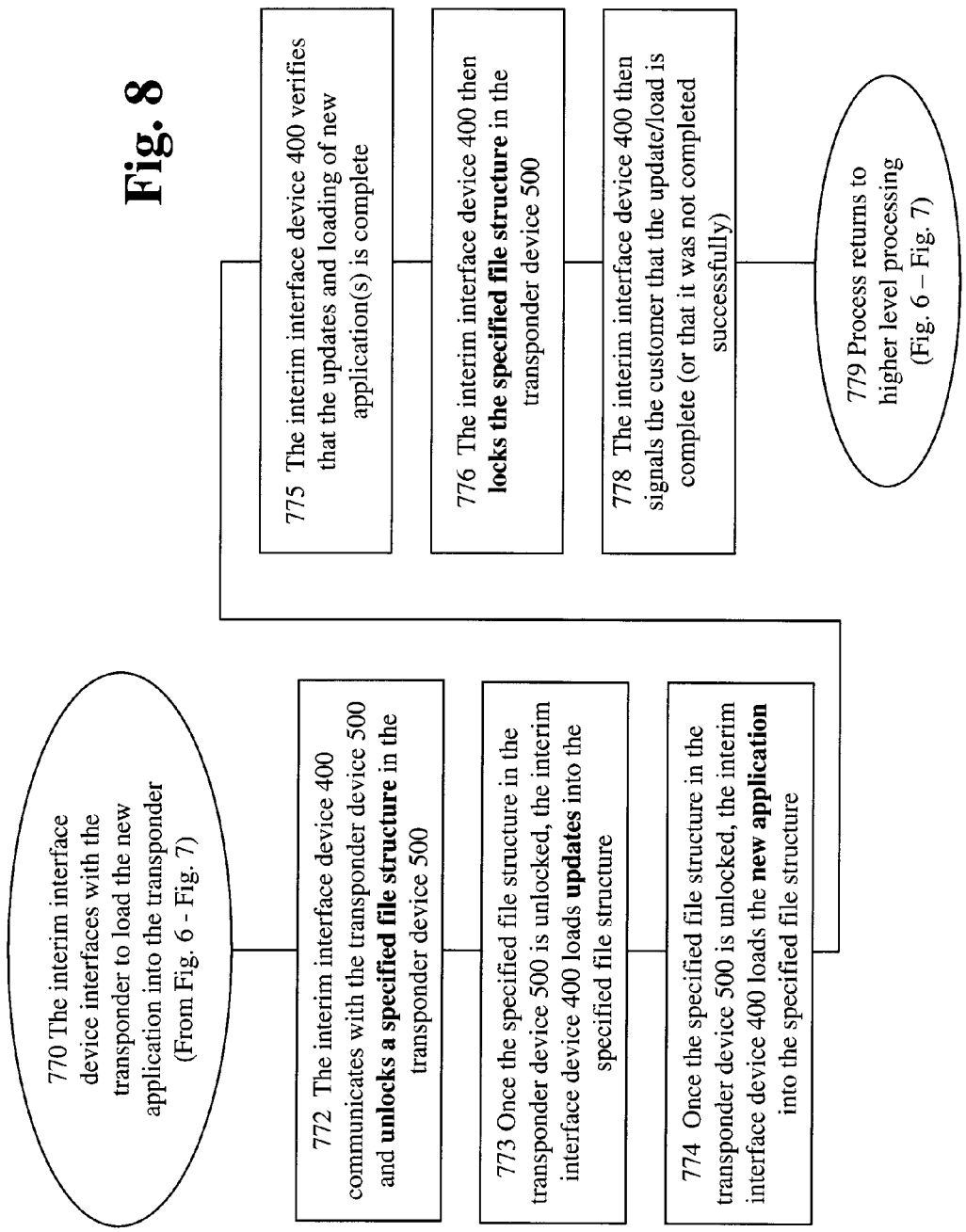
FIG. 8 is a flowchart showing the "interim interface device interfaces with the transponder to load the new application into the transponder" step of FIGS. 6 and 7 in further detail in accordance with one embodiment of the invention.

The subprocess of FIG. 8 starts in step 770 and passes to step 772. In step 772, the interim interface device 400 communicates with the transponder device 500 and unlocks a specified file structure in the transponder device 500. Then, the process passes to step 773. In step 773, once the specified file structure in the transponder device 500 is unlocked, the interim interface device 400 loads any updates, e.g. updates to a previously loaded application, into the specified file structure. After step 773, the process passes to step 774.

In step 774, with the specified file structure in the transponder device 500 being unlocked, the interim interface device 400 loads the new application into the specified file structure.

Then, in step 775, the interim interface device 400 verifies that the updates and loading of new application(s) is complete. Such verification might be performed in any suitable manner, such as testing the newly updated/loaded software. After step 775, the process passes to step 776.

In step 776, the interim interface device 400 locks the specified file structure in the transponder device 500. Thereafter, the particular application that was loaded is ready for use. After step 776, the process passes to step 778.

In step 778 of FIG. 8, the interim interface device 400 then signals the customer (e.g. via the interface 490 or the transponder user interface 542) that the update/load is complete. Alternatively, the interim interface device 400 signals the customer that the updates and/or load of the application was not completed successfully (and may provide a suitable message, such as a customer service number to call).

After step 778 of FIG. 8, the process passes to step 779. In step 779, the processing returns to the higher level processing from which it originally came. Thus, if the processing passed from FIG. 6 to FIG. 8, the process (in step 779) returns to step 757 of FIG. 6. Alternatively, if the processing passed from FIG. 7 to FIG. 8, the process (in step 779) returns to step 767 of FIG. 6.

The communications link 120 described above, as well as the various other communications links as described herein, may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections.

Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

As described above, the transponder device 500 includes a transponder communication portion 540. The transponder communication portion 540 provides for communications to the interim interface device 400, as well as for other communications. As shown in FIG. 11, the transponder communication portion 540 also includes a transponder user interface 542.

The transponder user interface 542 is provided to display certain attributes under particular conditions (such as when a particular application in the RFID device is utilized, when particular processing is performed, when an account balance is low, or when a particular account is accessed, for example). For example, the interface 490 might include the nature or particulars of a transaction (that was or is being performed), or which application on the transponder device 500 is being used. The transponder user interface 542 may include a button (or other interface) to control aspects of processing, e.g. what account is to be debited. The transponder device 500 as described herein may well be used over a long period of time and in a variety of environments and situations. For example, a user might well take their a cell phone with them virtually everywhere. Accordingly, there is potential for lose or theft of a device to which the transponder device 500 is connected. Accordingly, the transponder device 500, in accordance with one embodiment of the invention, is provided with a self destruct portion 590, as shown in FIG. 10. The self destruct portion 590, upon a suitable trigger event, will destruct the transponder device 500 so as to render the transponder device 500 inoperable. For example, the self destruct portion 590, so as to render the transponder device 500 inoperable, might destroy or disable the transponder device 500 (including destruction of the file structure, destruction of the chip, destruction of the operational circuitry, variance the operating code of the transponder device 500, or some other variance of the transponder device 500) so as to result in non-operability. Further, the self destruct portion 590 need not render all the applications on the transponder device 500 inoperable, but rather may selectively render a particular application inoperable. For example, a particular application associated with a compromised credit card might be destructed, whereas another application associated with an uncompromised card would remain operational.

A variety of events may be used which result in the destruction of an application or applications in the transponder device 500, including, for example: (1) The trigger event may include a time period. For example, the transponder device 500 may need to be refreshed periodically, e.g. every month, or else the device will become inoperative; (2) a signal from the bank system (or other source) might be output to the transponder device 500 and result in the destruction of the device; (3) the non-receipt of a signal or input, e.g. from the customer or bank system, for example, at a predetermined time may result in the destruction of the device; and/or (4) an attempt to use the device in some abnormal way, e.g. such as repeatedly entering the wrong password or other authentication.

As used herein, the destruction of, i.e., to destroy, the transponder device 500 includes the disablement of the device. Accordingly, "destruction" of the device may include either that the device is permanently destroyed or merely disabled (such that the device might later be enabled). Further, the transponder device may selectively determine whether the device is permanently destroyed or merely disabled (such that the device might later be enabled), i.e., based on some trigger events, the transponder device may be permanently destroyed, whereas based on other trigger events, the transponder device may be merely disabled (such that the device might later be enabled).

As used herein, information and data are used interchangeably.

Hereinafter, further aspects of implementation of the invention will be described. As described above, FIGS. 1-4 and 9-11 show embodiments of a system of the invention. Further, FIGS. 5-8 show various steps of one embodiment of the method of the invention.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A transponder alteration system for altering the state of a transponder device in the field, the transponder device used by a transponder user, and the transponder device disposed in a user device of a user, the system comprising:
   an interim interface device; and
   an alteration portion, in the form of a computer processing machine, disposed in a banking system, the alteration portion inputting an alteration request from a user for an application to be disposed upon the user's transponder device, the alteration portion:
      accessing a database to retrieve data to process the alteration request;
      generating an information packet for the user based on the retrieved data, and outputting the information packet to the user device of the user, the generating the information packet including adding location information into the information packet, the location information regarding a particular location to alter the transponder device;
      generating a data packet based on the retrieved data, and outputting the data packet to the interim interface device; and
   the interim interface device maintaining a watch mode to detect when the transponder device is in proximity to the interim interface device at the particular location;
   the interim interface device, from the watch mode, detecting that the transponder device is in proximity to the interim interface device;
   the interim interface device initiating communication with the proximate transponder device; and
   the interim interface device interfacing with the transponder device to transmit the data packet from the interim interface device to the transponder device.

2. The system of claim 1, wherein the alteration portion inputs a communication from the interim interface device indicating that the loading of the application upon the user's transponder device is completed.

3. The system of claim 1, wherein the transponder device is an RFID device.

4. The system of claim 1, wherein the interim interface device is disposed in physical proximity to the transponder device so as to dispose the application on the transponder device.

5. The system of claim 4, wherein the interim interface device is disposed in a cell phone case in which a cell phone is disposed.

6. The system of claim 5, wherein the transponder device is attached to the cell phone.

7. The system of claim 1, wherein the interim interface device is disposed in a fixed location, such that the transponder device is brought to the interim interface device to effect the loading of the application.

8. The system of claim 1, wherein the interim interface device, in interfacing with the transponder device to transmit the data packet to the transponder device unlocks a file structure in the transponder device, such that the file structure may receive at least some of the data in the data packet.

9. The system of claim 8, wherein the interim interface device interfaces with the transponder device using wireless technology.

10. The system of claim 1, wherein the application is selected from the group consisting of a loyalty application, a rewards application, a public transportation application, and a building access application.

11. The system of claim 1, wherein the transponder device includes at least one loaded application, the application becoming a loaded application once the application is loaded.

12. The system of claim 11, the transponder device including a self destruct portion, the self destruct portion causing the inoperability of the at least one loaded application.

13. The system of claim 12, the self destruct portion causing the inoperability of all of the loaded applications on the transponder device.

14. The system of claim 12, wherein the self destruct portion causing the inoperability of the at least one loaded application includes: the self destruct portion causing disablement of the at least one loaded application, such that the at least one loaded application is capable of later enablement.

15. The method of claim 14, wherein the communication portion and the alteration portion are disposed in a banking system.

16. The method of claim 14, wherein the communication portion and the alteration portion are disposed in a non-banking system.

17. The system of claim 12, wherein the self destruct portion causing the inoperability of the at least one loaded application includes: the self destruct portion causing destruction of the at least one loaded application, such that the at least one loaded application is not capable of later enablement.

18. A transponder alteration system for altering the state of a transponder device in the field, the transponder device used by a transponder user, and the transponder device disposed in a user cell phone device of a user, the system comprising:
   a transponder device;
   an interim interface device; and
   an alteration portion, in the form of a computer processing machine, disposed in a banking system, the alteration portion inputting an alteration request from the user cell phone device for an application to be disposed upon the user's transponder device disposed in the user cell phone device of a user, the alteration portion:
      accessing a database to retrieve data, based on the alteration request, to process the alteration request;
      generating an information packet for the user cell phone device based on the retrieved data, which was retrieved from the database, the generating the information packet including adding location information into the information packet, the location information regarding a particular location to alter the transponder device;
      outputting the information packet to the user cell phone device;
      generating a data packet based on the retrieved data, which was retrieved from the database, and
      outputting the generated data packet to the interim interface device; and
   the interim interface device maintaining a watch mode to detect when the transponder device is in proximity to the interim interface device at the particular location;
   the interim interface device, from the watch mode, detecting that the transponder device is in proximity to the interim interface device;
   the interim interface device initiating communication with the proximate transponder device; and
   the interim interface device interfacing with the transponder device to transmit the data packet from the interim interface device to the transponder device;

wherein the application is selected from the group consisting of a loyalty application, a rewards application, a public transportation application, and a building access application;
the transponder device includes at least one loaded application; and
the transponder device includes a self destruct portion, the self destruct portion causing the inoperability of the at least one loaded application.

19. A method for altering the state of a transponder device in the field, the transponder device used by a transponder user, and the transponder device disposed in a user device of a user, the method comprising:
inputting, by a communication portion, an alteration request from a user for an application to be disposed upon the user's transponder device disposed in the user device of a user, the communication portion forwarding particulars of the request to an alteration portion;
performing processing, by the alteration portion, of the particulars of the request, the processing including:
accessing a database to retrieve data to process the alteration request;
generating an information packet for the user based on the retrieved data, the generating the information packet including adding location information into the information packet, the location information regarding a particular location to alter the transponder device;
outputting the information packet to the user device of the user;
generating a data packet based on the retrieved data, and outputting the data packet to an interim interface device; and
maintaining, by the interim interface device, a watch mode to detect when the transponder device is in proximity to the interim interface device at the particular location;
detecting, by the interim interface device, from the watch mode, that the transponder device is in proximity to the interim interface device;
initiating, by the interim interface device, communications with the proximate transponder device; and
interfacing, by the interim interface device, with the transponder device to transmit the data packet from the interim interface device to the transponder device; and
wherein the alteration portion is in the form of a computer processing machine.

* * * * *